(12) United States Patent
Lee

(10) Patent No.: US 12,469,499 B2
(45) Date of Patent: Nov. 11, 2025

(54) DYNAMIC VOICE ASSISTANT SYSTEM FOR A VEHICLE

(71) Applicant: CERENCE OPERATING COMPANY, Burlington, MA (US)

(72) Inventor: Cassandra Lee, Markham (CA)

(73) Assignee: CERENCE OPERATING COMPANY, Burlington, MA (US)

( * ) Notice: Subject to any disclaimer, the term of this patent is extended or adjusted under 35 U.S.C. 154(b) by 510 days.

(21) Appl. No.: 17/848,598

(22) Filed: Jun. 24, 2022

(65) Prior Publication Data

US 2023/0419971 A1 Dec. 28, 2023

(51) Int. Cl.
| | |
|---|---|
| *G10L 17/22* | (2013.01) |
| *B60Q 9/00* | (2006.01) |
| *G10L 17/02* | (2013.01) |
| *G10L 17/06* | (2013.01) |
| *G10L 25/63* | (2013.01) |
| *G10L 25/78* | (2013.01) |

(52) U.S. Cl.
CPC ................ *G10L 17/22* (2013.01); *B60Q 9/00* (2013.01); *G10L 17/02* (2013.01); *G10L 17/06* (2013.01); *G10L 25/63* (2013.01); *G10L 25/78* (2013.01)

(58) Field of Classification Search
CPC ......... G10L 17/22; G10L 17/02; G10L 17/06; G10L 25/63; G10L 25/78; B60Q 9/00; G06F 3/167
See application file for complete search history.

(56) References Cited

U.S. PATENT DOCUMENTS

| | | | | |
|---|---|---|---|---|
| 2014/0136201 A1* | 5/2014 | Hecht | ................ | G10L 15/065 |
| | | | | 704/244 |
| 2014/0309806 A1* | 10/2014 | Ricci | ................ | G06F 21/31 |
| | | | | 701/1 |
| 2015/0169284 A1 | 6/2015 | Quast et al. | | |
| 2021/0104220 A1* | 4/2021 | Mennicken | ............. | G06F 3/165 |
| 2022/0051071 A1 | 2/2022 | Prayaga et al. | | |

OTHER PUBLICATIONS

International Search Report and Written Opinion of PCT application No. PCT/US2023/026073 dated Sep. 25, 2023.

* cited by examiner

*Primary Examiner* — Bhavesh M Mehta
*Assistant Examiner* — Jangwoen Lee
(74) *Attorney, Agent, or Firm* — Brooks Kushman P.C.

(57) ABSTRACT

A voice assistant system for a vehicle includes a microphone configured to detect an audio signal from a user of the vehicle; a speaker configured to output a dialogue in response to the audio signal; and a processor programmed to responsive to detecting a conversation in which the user is involved, decrease a lengthiness setting of the voice assistant system to reduce the length of the dialogue, and increase an independency setting of the voice assistant system to prevent a confirmation question from the voice assistant system.

17 Claims, 9 Drawing Sheets

DYNAMIC VOICE ASSISTANT SYSTEM FOR A VEHICLE

TECHNICAL FIELD

The present disclosure generally relates to a dynamic voice assistant system for a vehicle. More specifically, the present disclosure relates to a vehicle voice assistant system that may be dynamically adjusted and customized.

BACKGROUND

Voice assistance systems have been increasingly used in vehicles to perform various tasks by interacting with one or more vehicle users. Different vehicle users may prefer different human-like personalities during the interaction. The personality assignment may not only affect the sound and tone of the system voice, but also the content of the speed that the system interacts with the user. For instance, the system may adjust the decision making, what information to provide and how the information is presented to the user based on different personality assignments.

SUMMARY

In one or more illustrative example of the present disclosure, a voice assistant system for a vehicle includes a microphone configured to detect an audio signal from a user of the vehicle; a speaker configured to output a dialogue in response to the audio signal; and a processor programmed to responsive to detecting a conversation in which the user is involved, decrease a lengthiness setting of the voice assistant system to reduce the length of the dialogue, and increase an independency setting of the voice assistant system to prevent a confirmation question from the voice assistant system.

In one or more illustrative example of the present disclosure, a method for a voice assistant system of a vehicle includes detecting, via a microphone, an utterance from one of a plurality of users of the vehicle; identifying the one user of the plurality of users who made the utterance; determining a user characteristic associated with the one user; and adjust a plurality of voice assistant settings between a least one lower bound and at least one upper bound based on the user characteristic.

In one or more illustrative example of the present disclosure, a non-transitory computer-readable medium includes instructions when executed by a processor of a vehicle, cause the vehicle to detect, via a microphone, an utterance from one of a plurality of users of the vehicle; identify, via the processor, the one user of the plurality of users who made the utterance; determine, via the processor, a user characteristic associated with the one user; adjust, via the processor, a plurality of voice assistant settings between a least one lower bound and at least one upper bound based on the user characteristic; and output, via a speaker, a dialogue based on plurality of voice assistant settings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
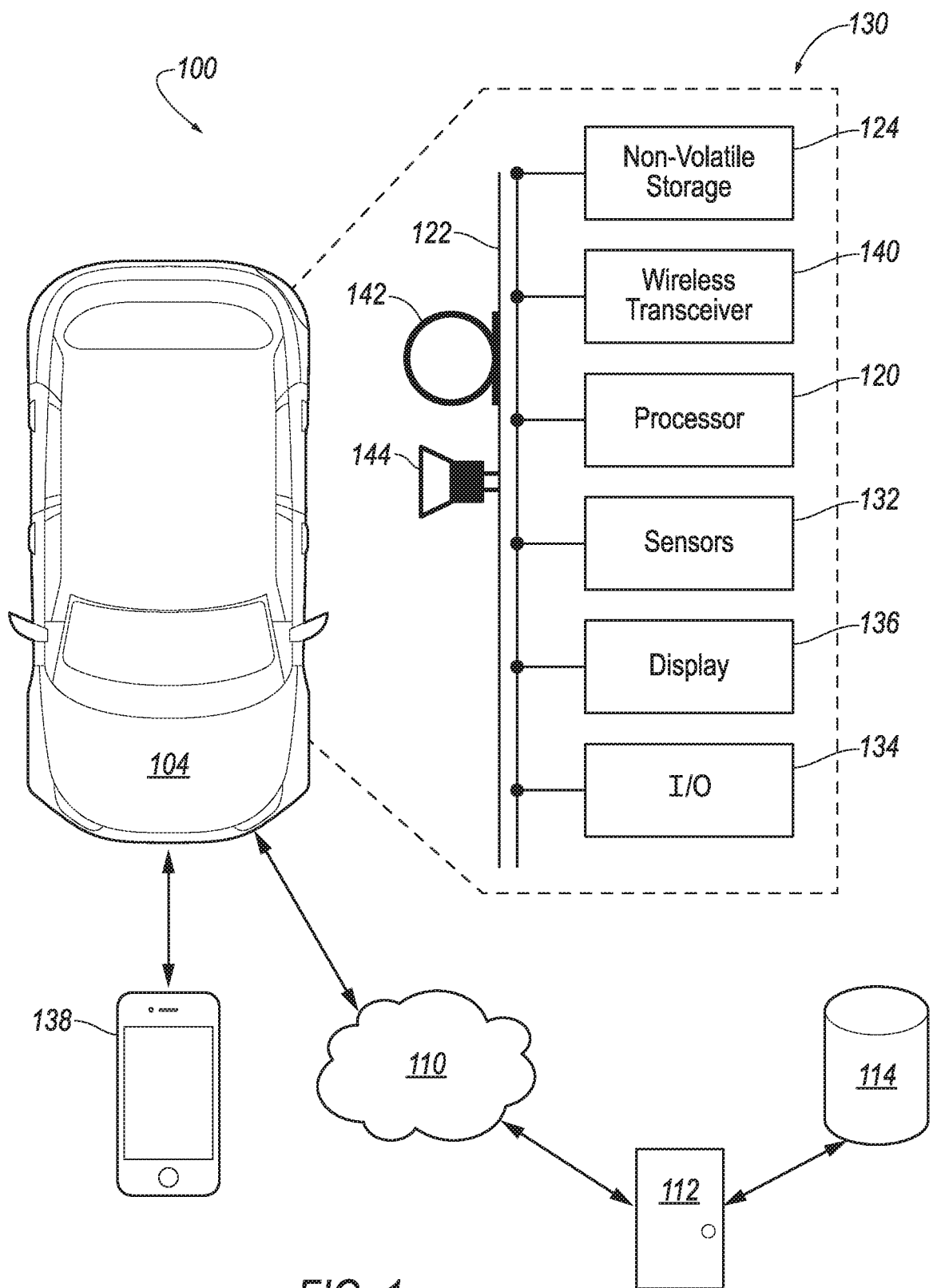
FIG. 1 illustrates a block diagram for a vehicle audio and voice assistant system in an automotive application having a processing system in accordance with one embodiment.

FIG. 1 illustrates a block diagram for an automotive voice assistant system 100 having a multimodal input processing system in accordance with one embodiment. The automotive voice assistant system 100 may be designed for a vehicle 104 configured to transport passengers. The vehicle 104 may include various types of passenger vehicles, such as crossover utility vehicle (CUV), sport utility vehicle (SUV), truck, recreational vehicle (RV), boat, plane or other mobile machine for transporting people or goods. Further, the vehicle 104 may be autonomous, partially autonomous, self-driving, driverless, or driver-assisted vehicles. The vehicle 104 may be an electric vehicle (EV), such as a battery electric vehicle (BEV), plug-in hybrid electric vehicle (PHEV), hybrid electric vehicle (HEVs), etc.

The vehicle 104 may be configured to include various types of components, processors, and memory, and may communicate with a communication network 110. The communication network 110 may be referred to as a "cloud" and may involve data transfer via wide area and/or local area networks, such as the Internet, Global Positioning System (GPS), cellular networks, Wi-Fi, Bluetooth, etc. The communication network 110 may provide for communication between the vehicle 104 and an external or remote server 112 and/or database 114, as well as other external applications, systems, vehicles, etc. This communication network 110 may provide navigation, music or other audio, program content, marketing content, internet access, speech recognition, cognitive computing, artificial intelligence, to the vehicle 104.

The remote server 112 and the database 114 may include one or more computer hardware processors coupled to one or more computer storage devices for performing steps of one or more methods as described herein and may enable the vehicle 104 to communicate and exchange information and data with systems and subsystems external to the vehicle 104 and local to or onboard the vehicle 104. The vehicle 104 may include one or more processors 120 configured to perform certain instructions, commands and other routines as described herein. Internal vehicle networks 122 may also be included, such as a vehicle controller area network (CAN), an Ethernet network, and a media oriented system transfer (MOST), etc. The internal vehicle networks 122 may allow the processor 120 to communicate with other vehicle 104 systems, such as a vehicle modem, a GPS module and/or Global System for Mobile Communication (GSM) module configured to provide current vehicle location and heading information, and various vehicle electronic control units (ECUs) configured to corporate with the processor 120.

The processor 120 may execute instructions for certain vehicle applications, including navigation, infotainment, climate control, etc. Instructions for the respective vehicle systems may be maintained in a non-volatile manner using a variety of types of computer-readable storage medium 124. The computer-readable storage medium 124 (also referred to herein as memory 124, or storage) includes any non-transitory medium (e.g., a tangible medium) that participates in providing instructions or other data that may be read by the processor 120. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and structured query language (SQL).

The processor 120 may also be part of a multimodal processing system 130. The multimodal processing system 130 may include various vehicle components, such as the processor 120, memories 124, sensors 132, input/output devices 134, displays 136, etc. The multimodal processing system 130 may include one or more input and output devices 134 for exchanging data processed by the multimodal processing system 130 with other elements shown in FIG. 1 via a human-machine interface (HMI) controls (not shown). Certain examples of these processes may include navigation system outputs (e.g., time sensitive directions for a driver), incoming text messages converted to output speech, vehicle status outputs, and the like, e.g., output from a local or onboard storage medium or system. In some embodiments, the multimodal processing system 130 provides input/output control functions with respect to one or more electronic devices, such as a head-up-display (HUD) 136, vehicle display 136, and/or mobile device 138 of the driver or passenger, sensors 132, cameras 132, etc. The multimodal processing system 130 includes dynamic adjustment features configured to adjust the personality of the automotive voice assistant system 100 based on user behavior, vehicle occupancy, and/or outside environment detected by the vehicle sensors 132, as described in more detail below.

The vehicle 104 may include a wireless transceiver 140, such as a BLUETOOTH® module, a ZIGBEE® transceiver, a Wi-Fi transceiver, an Infrared Data Association (IrDA) transceiver, a radio frequency identification (RFID) transceiver, an ultra-wide band (UWB), etc. configured to communicate with compatible wireless transceivers of various user devices, as well as with the communication network 110.

The vehicle 104 may include various sensors and input devices as part of the multimodal processing system 130. For example, the vehicle 104 may include at least one microphone 142. The microphone 142 may be configured to receive audio signals from within the vehicle cabin, such as acoustic utterances including spoken words, phrases, or commands from a user. The microphone 142 may include an audio input configured to provide audio signal processing features, including amplification, conversions, data processing, etc., to the processor 120. The vehicle 104 may include at least one microphone 142 arranged throughout the vehicle 104. While the microphone 142 is described herein as being used for purposes of the multimodal processing system 130, the microphone 142 may be used for other vehicle features such as active noise cancelation, hands-free interfaces, etc. The microphone 142 may facilitate speech recognition from audio received via the microphone 142 according to grammar analysis associated with available commands, and voice prompt generation. The microphone 142 may include a plurality of microphones 142 arranged throughout the vehicle cabin.

The microphone 142 may be configured to receive audio signals from the vehicle cabin. These audio signals may include occupant utterances, sounds, etc. The processor 120 may receive these audio signals to determine the number of occupants within the vehicle. For example, the processor 120 may detect various voices, via tone, pitch, frequency, etc., and determine that more than one occupant is within the vehicle at a given time. Based on the audio signals and the various frequencies, etc., the processor 120 may determine the number of occupants. Based on this the processor 120 may adjust certain settings relating to automobile voice assistant system 100. This is described in more detail below. Additionally or alternatively, in case that a plurality of microphones 142 are provided throughout the vehicle cabin, the plurality of microphones 142 may enable an omnidirectional measurement of a voice command uttered by the occupants at different seat locations inside the cabin such that the identity of the occupant made the voice command may be more precisely determined based on the identify of the user located at different seat locations.

The microphone 142 may also be used to identify an occupant via directly identification (e.g., a spoken name), or by voice recognition performed by the processor 120. The microphone may also be configured to receive non-occupancy related data such as verbal utterances, etc.

The sensors 132 may include at least one camera configured to provide for facial recognition of the occupant(s). The camera 132 may also be configured to detect non-verbal cues as to the driver's behavior such as the direction of the user's gaze, user gestures, etc. The camera 132 may monitor the driver head position, as well as detect any other movement by the user, such as a motion with the user's arms or hands, shaking of the user's head, etc. In the example of a camera 132, the camera may provide imaging data taken of the user to indicate certain movements made by the user. The camera 132 may be a camera capable of taking still images, as well as video and detecting user head, eye, and body movement. The camera 132 may include multiple cameras and the imaging data may be used for qualitative analysis. For example, the imaging data may be used to determine if the user is looking at a certain location or vehicle display 136. Additionally or alternatively, the imaging data may also supplement timing information as it relates to the user motions or gestures. The imaging data may be used to determine a user's mood in addition to the voice data detected via the microphone 142. Based on the user mood, the processor 120 may adjust certain settings relating to automobile voice assistant system 100.

The vehicle 104 may include an audio system having audio playback functionality through vehicle speakers 144 or headphones. The audio playback may include audio from sources such as a vehicle radio, including satellite radio, decoded amplitude modulated (AM) or frequency modulated (FM) radio signals, and audio signals from compact disc (CD) or digital versatile disk (DVD) audio playback, streamed audio from a mobile device, commands from a navigation system, voice output from the automotive voice assistance system 100, etc.

As explained, the vehicle 104 may include various displays and user interfaces, including HUDs, center console displays, steering wheel buttons, etc. Touch screens may be configured to receive user inputs. Visual displays 136 may be configured to provide visual outputs to the user.

The sensors 132 may further include other sensors configured to detect and measure data that is not described above. This sensor 152 may include one or more sensors in addition to the microphone 132, data provided by which may be used to aid in detecting occupancy, such as pressure sensors within the vehicle seats, door sensors, cameras etc. This occupant data from these sensors may be used in combination with the audio signals to determine the occupancy, including the number of occupants.

While not specifically illustrated herein, the vehicle 104 may include numerous other systems such as GPS systems, human-machine interface (HMI) controls, video systems, etc. The multimodal processing system 130 may use inputs from various vehicle systems, including the speaker 144 and the sensors 132. For example, the multimodal processing system 130 may determine whether an utterance by a user is system-directed (SD) or non-system directed (NSD). SD utterances may be made by a user with the intent to affect an output within the vehicle 104 such as a spoken command of "turn on the music." A NSD utterance may be one spoken during conversation to another occupant, while on the phone, or speaking to a person outside of the vehicle. These NSDs are not intended to affect a vehicle output or system. The NSDs may be human-to-human conversations.

While an automotive system is discussed in detail here, other applications may be appreciated. For example, similar functionally may also be applied to other, non-automotive cases, e.g. for augmented reality or virtual reality cases with smart glasses, phones, eye trackers in living environment, etc. While the terms "user" is used throughout, this term may be interchangeable with others such as speaker, occupant, driver, etc.

Figure 2:
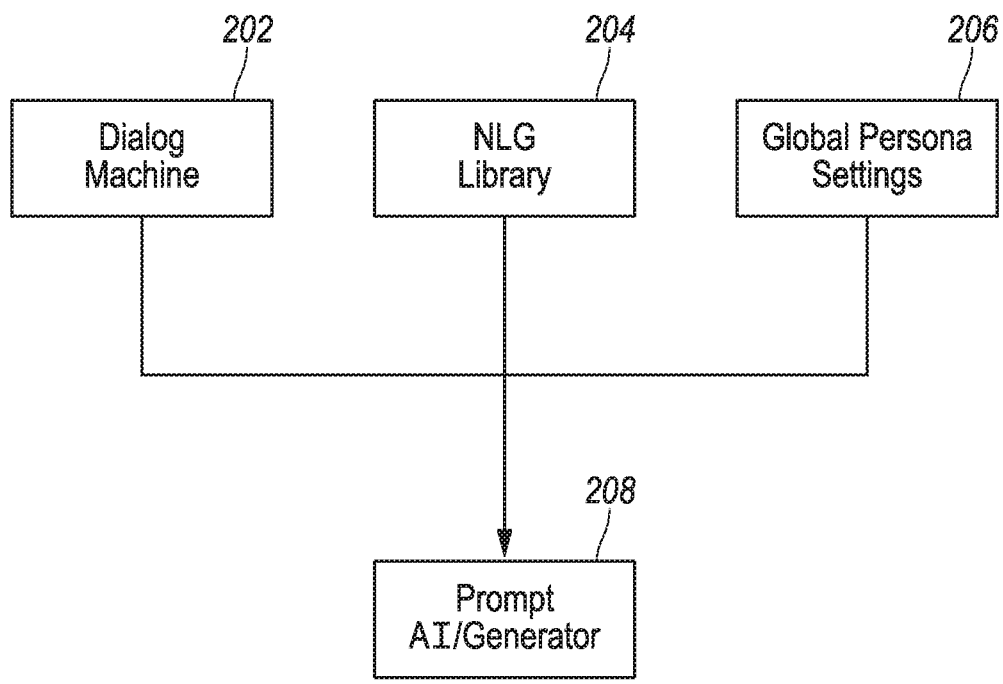
FIG. 2 illustrates a block architecture diagram for a customizable audio and voice assistant system in accordance with one embodiment.

Referring to FIG. 2 an example block architecture diagram of a voice assistant customization system 200 in accordance with one embodiment is illustrated. The system 200 may allow a vehicle designer/engineer to customize and adjust the voice assistant features before the features are implemented onto the vehicle 104 of FIG. 1. Additionally, the system 200 may allow the designer to modify global persona/personality configuration of the voice assistant features after installation onto the vehicle 104 through one or more communication means such as via the wireless transceiver 140 of the multimodal system 130 of the vehicle 104. As an example, the voice assistance customization system 200 may be implemented via the remote server 112 in combination with the database 114.

The voice assistant customization system 200 may include a dialog machine 202 configured to govern a structure of conversation. Occupants of the vehicle 104 may partake in certain dialog with the vehicle 104 as well as each other. The dialog machine 202 may be configured to control the structure of the conversation in a manner that location or customer information are disregarded. That is, the dialog machine 202 may be configured to assemble pieces of dialog structure to facilitate a prompt construction irrespective of the specific environment and user identity. The voice assistance customization system 200 may further include a natural language generation (NLG) library 204 configured to store and list possible expressions of variable and/or concept. The NLG library 204 may be further configured to map the possible expressions to different personas in various locales. The voice assistant customization system 200 may further include a global persona setting component 206 configured to allow a vehicle designer to customize and adjust global persona settings (a.k.a. personality settings) for one or more vehicle models based on a desired personality in each respective locale and use case. The global persona setting component 206 may be implemented in various manner. For instance, the global persona setting component 206 may be implemented using a computing hardware device provided with processing capability in combination with software. Details of the global persona setting component 206 will be described in detail below. The voice assistant customization system 200 may further include a prompt generator 208 configured to generate one or more prompts as voice output based on configurations from the dialog machine 202, the NLG library 204 and the global persona setting component 206, to allow the multimodal system 130 of the vehicle 104 to engage a conversation with one or more vehicle users. The prompt generator 208 may use artificial intelligence (AI) and historical system setting data to generate the prompt/dialogue. A vehicle designer may adjust the configuration to the global persona setting component 206 based on the prompt output from the prompt generator 208.

Figure 3A:
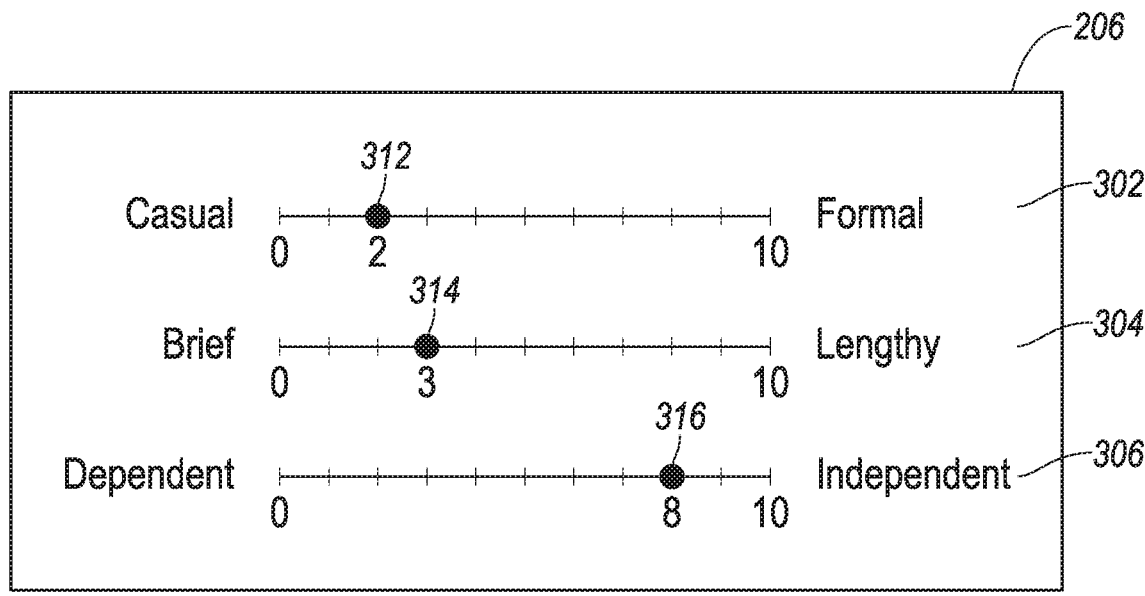
FIGS. 3A and 3B illustrate diagrams of a voice assistance persona interface in accordance with one embodiment.

Referring to FIG. 3A, an interface diagram of the global persona setting component 206 in accordance with one embodiment is illustrated. With continuing reference to FIGS. 1 and 2, the global persona setting component 206 in the present example may be configured to allow a vehicle designer to customize and adjust persona settings including formality 302, lengthiness 304, and independency 306. As illustrated in FIG. 3A, each setting may correspond to a value that may be adjusted via a slider having a predefined range and may affect the commands or output from the vehicle speakers 144 in response to a spoken utterance from a user. The formality setting 302 may correspond to a formality slider 312 adjustable between a minimum magnitude value of zero indicative of a casual persona and a maximum magnitude value of ten indicative of a formal persona. The formality setting 302 may be associated with a dialogue formality style of the voice assistant feature of the vehicle multimodal system 130. The vehicle designer may adjust the formality value by sliding the slider 312 left and right. When the formality value is low, the voice assistant may be configured to perform the speech in a more casual style. For instance, responsive to the vehicle user setting a navigation destination, the voice assistant may output "Sure! I will get you there as soon as possible." When the formality value is high, the voice assistant may be configured to perform the speech in a more formal style. Taking the same example above, the voice assistant may confirm the destination by outputting "Well received. I will navigate you to the destination on the fastest route."

The lengthiness setting 304 may correspond to a lengthiness slider 314 adjustable between a minimum value of zero indicative of a brief speech and a maximum value of ten indicative of a lengthy speech. The lengthiness setting 304 may be associated with the wordiness style of the speech of the voice assistant feature of the vehicle multimodal system 130. When the lengthiness value is low, the voice assistant may be configured to perform a shorter speech. Continuing with the above navigation example, the voice assistant may only output "OK!" to confirm the navigation destination. When the lengthiness value is high, the voice assistant may be configured to perform a longer speech. For instance, the voice assistant may output "OK! The navigation destination has been successfully set." in confirmation.

The independency setting 306 may correspond to an independency slider 316 adjustable between a minimum value of zero indicative of a dependent persona and a maximum value of ten indicative of an independent persona. The independency setting 306 may be associated with how independent the voice assistant may perform a task without requiring a user input. When the independency value is low, the voice assistant of the multiple modal system 130 may be configured more dependent upon the user before starting to perform a task. For instance, responsive to receiving the navigation destination, the voice assistant may require a user confirmation such as "Please confirm that you want me to start navigation" before starting to navigate the route. In contrast, when the independency value is high, the voice assistant may be configured to act more like an agent of the vehicle user that performs tasks more independently. Continuing with the above navigation example, responsive to receiving the destination, the voice assistant may output "OK. Starting to navigate." and automatically start the navigation without seeking a confirmation from the user.

In the embodiment illustrated with reference to FIG. 3A, a single slider block corresponding to a single value as the global setting for one or more vehicles. For instance, the formality slider 312 has a value of two out of ten, the lengthiness slider 314 has a value of three out of ten, and the independency slider 316 has the value of eight out of ten as the global setting for the vehicle 104. A predefined range may be provided to each setting by default. In this way, the multimodal system 130 of the vehicle 104 may be configured to automatically adjust the settings to be within this range. For instance, the global persona setting component 206 may be preconfigured to assign a +/−1 range variation from the value set by the vehicle designer. Taking the formality setting for instance, when the vehicle designer sets the formality value to two via the formality slider 312, the actual value of the voice assistant of the vehicle multimodal system 130 may range between one and three adjusted based on the specific usage scenario of the vehicle 104 (to be discussed in detail below). Additionally, the upper and lower range from the designer selected value may be different (e.g. −1 for lower bound, and +2 for the upper bound). Additionally, different range may be assigned to different settings. For instance, while the formality setting 302 may be configured to allow +/1 variation, the lengthiness setting 304 may be configured to allow +/−3 variation. This may allow for a more customizable and flexible setting for each attribute.

Although sliders are used to adjust the persona setting in the present example, the present disclosure is not limited thereto and other means for adjust the value of the settings may be used under essentially the same concept. For instance, other gradient-like settings such as pie charts, bars, scatters, etc., may be used to allow the user to adjust the settings. In another example, the interface may allow the vehicle designer to manually input the value corresponding to each setting. It is further noted that although a magnitude of zero to ten for all three persona setting values are used in the present example as illustrated with reference to FIG. 3A, the present disclosure is not limited thereto. Different persona settings may be assigned with different magnitude quantification.

Figure 3B:
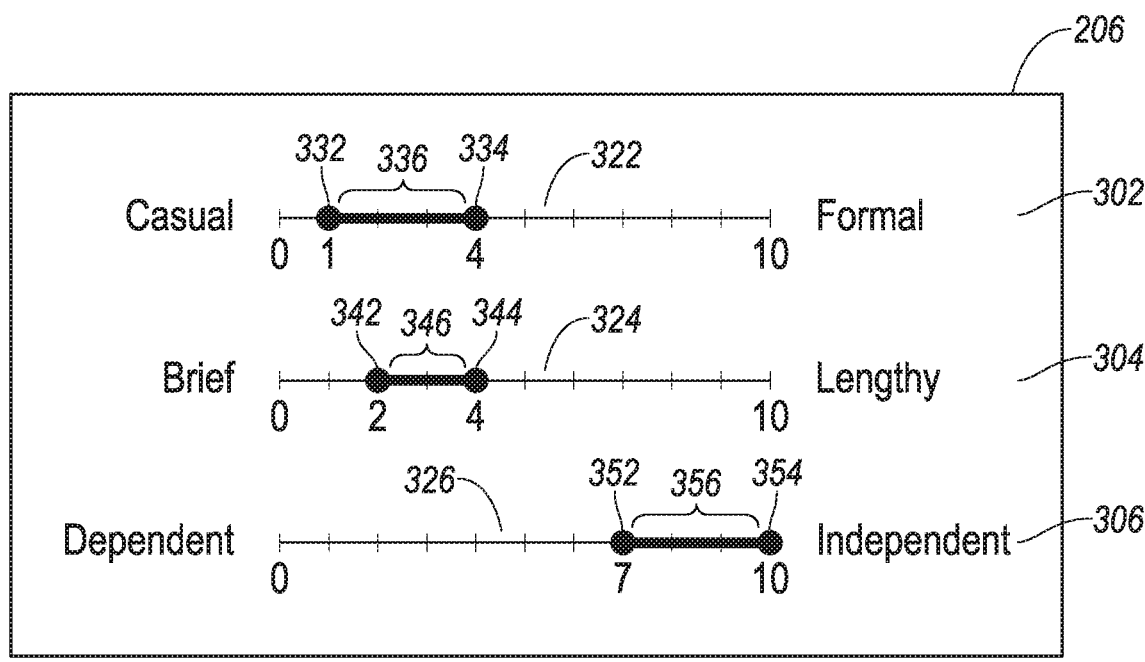

Referring to FIG. 3B, an interface diagram of the global personal setting component 206 in accordance with another embodiment is illustrated. Different from the example as illustrated with reference to FIG. 3A, the global persona setting component 206 in the present example may be configured to allow the vehicle designer to manually set a global range for each persona setting. The formality setting 302 may correspond to a formality slider 322 adjustable between a minimum value of zero indicative of a casual persona and a maximum value of ten indicative of a formal persona. The formality slider 322 may be associated with a lower slider block 332 defining a lower bound and an upper slider block 334 defining an upper bound of the global formality setting 302. The lower and upper bounds define a global formality value range 336 within which vehicle 104 is allowed to dynamically adjust the formality setting 302. The vehicle designer may manually customize the formality range 336 by adjusting the lower slider block 332 and/or the upper slider block 334.

The lengthiness setting 304 may correspond to a lengthiness slider 322 adjustable between a minimum value of zero indicative of a brief speech and a maximum value of ten indicative of a lengthy speech. The lengthiness slider 324 may be associated with a lower slider block 342 defining a lower bound and an upper slider block 344 defining an upper bound of the global lengthiness setting 304. The lower and upper bounds define a global formality value range 346 within which vehicle 104 is allowed to dynamically adjust the lengthiness setting 304. The vehicle designer may manually customize the lengthiness range 346 by adjusting the lower slider block 342 and/or the upper slider block 344.

The independency setting 306 may correspond to an independency slider 326 adjustable between a minimum value of zero indicative of a dependent persona and a maximum value of ten indicative of an independent persona. The independency slider 326 may be associated with a lower slider block 352 defining a lower bound and an upper slider block 354 defining an upper bound of the global independency setting 304. The lower and upper bounds define a global formality value range 356 within which vehicle 104 is allowed to dynamically adjust the independency setting 306. The vehicle designer may manually customize the independency range 356 by adjusting the lower slider block 352 and/or the upper slider block 354.

Figure 4A:
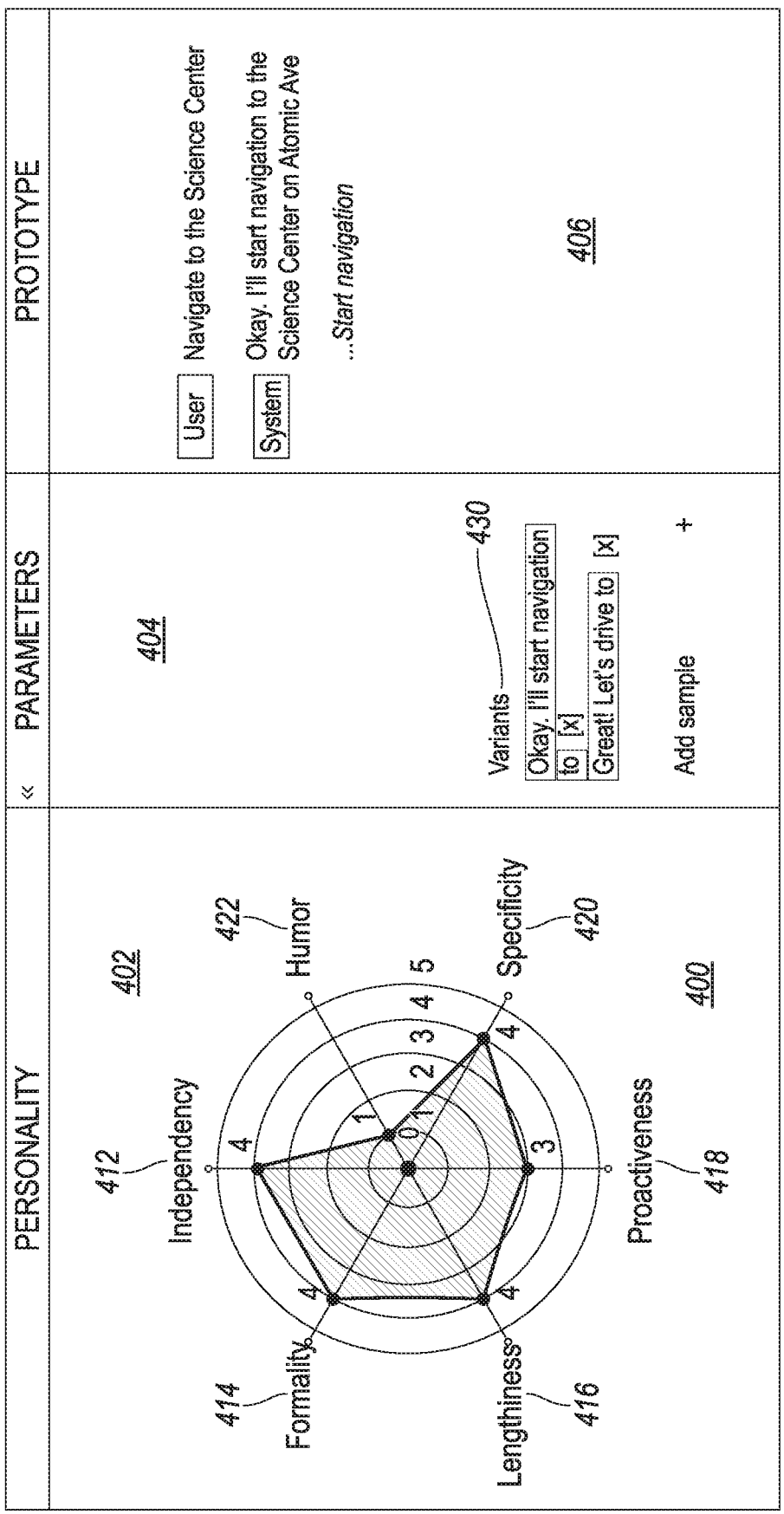
FIGS. 4A and 4B illustrate diagrams of a voice assistance persona interface in accordance with another embodiment.
Figure 4B:
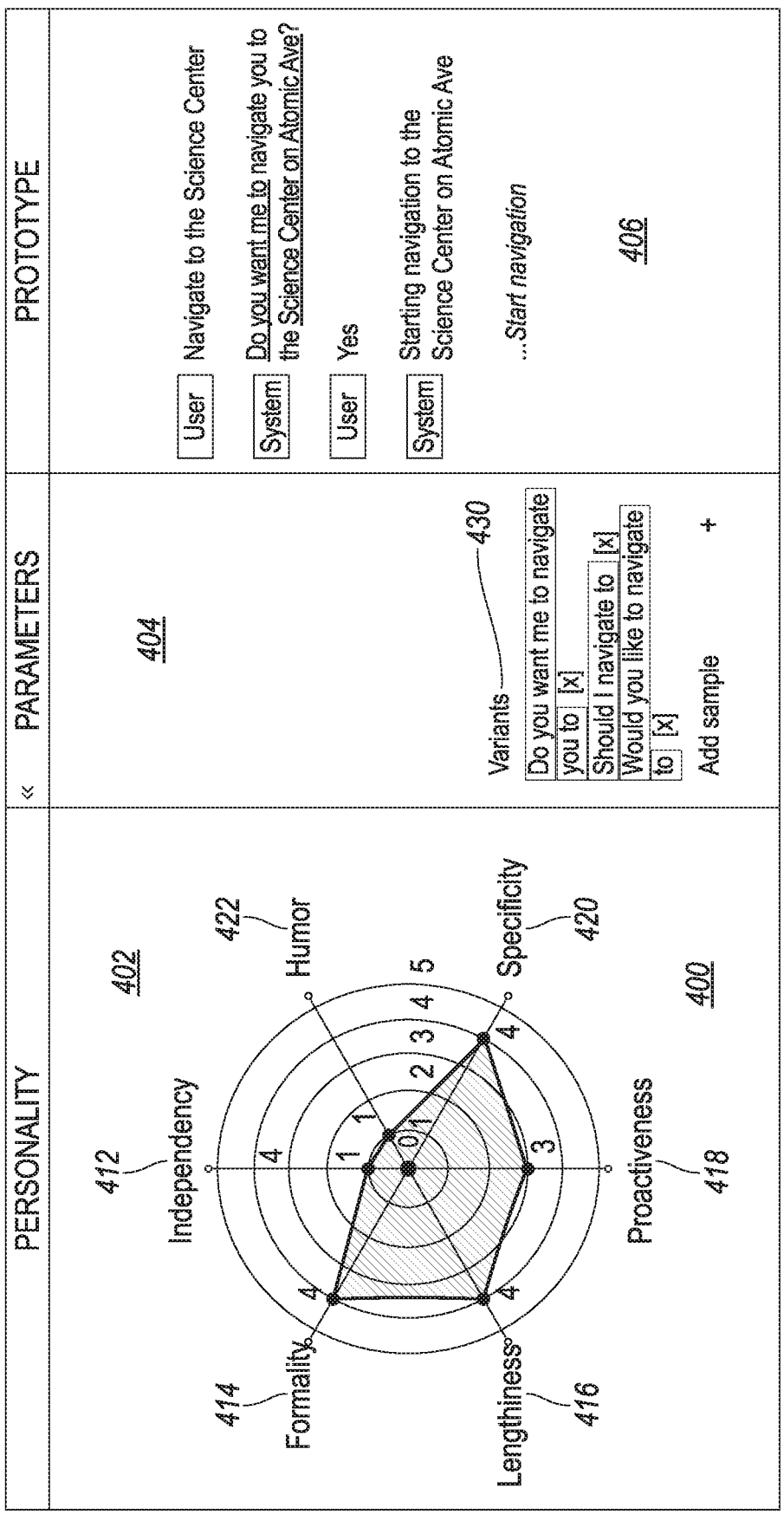

Referring to FIGS. 4A and 4B, an interface diagram 400 of the global personal setting component 206 in accordance with yet another embodiment is illustrated. This may be an example interface presented to the user via the display 136 or mobile device, but in practice may likely be an interface provided to the vehicle designer as a visual way to understand the settings or example users. The persona setting interface 400 may include a personality section 402 configured to adjust the persona of the voice assistant, a parameter section 404 configured to receive parameters such as the question, and a prototype section configured to output conversation. Similar to the embodiments illustrated with reference to FIGS. 3A and 3B, the vehicle designer may adjust the persona settings of the voice assistant via the personality section 402 illustrated as a graphical user interface (GUI). In the present example, the persona setting may include an independency setting 412 be associated with a degree of independency of the voice assistant feature of the vehicle multimodal system 130. The personality setting may further include a formality setting 414 associated with the formality style of the speech of the voice assistant. The personality setting may further include a lengthiness setting 416 associated with the conversation length style of the voice assistant. The personality setting may further include a proactiveness setting 418 associated with a degree of proactiveness of the voice assistant. The personality setting may further include a specificity setting 420 associated with the conversation specificity style of the voice assistant. The personality setting may further include a humor setting 422 associated with the conversation humor style of the voice assistant.

As illustrated in FIGS. 4A and 4B, the personality section is presented in the form of a radar chart (a.k.a. spiderweb chart) in the present embodiment to present multiple setting variables at the same time. The radar chart may include a plurality of spokes each represent the current setting value of the respective setting. The data length of each spoke may be proportional to the magnitude of the data value corresponding to the respective setting. In the present embodiment, each setting spoke may be adjusted between a minimum magnitude of zero and a maximum magnitude of five via a slider along each respective spoke. For instance, the vehicle designer may reduce the independency setting 412 of the voice assistant from four as illustrated in FIG. 4A to one as illustrated in FIG. 4B by sliding down the slider on the corresponding spoke. As discussed above with reference to FIGS. 3A and 3B, when the independency setting is associated with a higher value (e.g. value four), the voice assistant may act in a more independent manner.

Continuing with the above navigation example, in response to the vehicle designer inputting "Navigate to the Science Center," the voice assistant may directly respond "Okay. I'll start navigation to the Science Center on Atomic Ave" via the prototype section 406 without asking for a confirmation from the vehicle designer. The prototype section 406 may be associated with the prompt generator 208 as a part of the voice assistant customization system 200. Here, the above answer from the voice assistant may be one a plurality of candidate variants 430 that correspond to the current global persona settings at the personality section 402 and is configurable via the parameter section 404. In the present example, two candidate variants 430 are presented to the vehicle designer via the parameter section 404 and the vehicle designer may make a manual selection from the variants 430. Additionally, the parameter section 404 may be further configured to allow the vehicle designer to add more candidate variants in response to a user input that correspond to the global persona setting configured at the personality section 402. For instance, the vehicle designer may manually type in an answer as an additional candidate variant via parameter section 404. Additionally, the vehicle designer may remove one or more candidate variants from the parameter section 404 such that the removed variant may no longer be considered for the corresponding global persona setting configured via the personality section 402.

As illustrated in FIG. 4B, in response to the independency setting 412 being reduced from four to one, the voice assistant may act in a more reliant manner and seek for a user confirmation before proceeding to perform the assigned task. Continuing with the above navigation example, the voice assistant may output a confirmation dialog such as "Do you want me to navigate you to the Science Center on Atomic Ave?" Similarly, the vehicle designer may add, remove and modify candidate variants via the parameter section 404.

Although the zero and five are used in the present example to define the range of the value settings, it is noted that the present disclosure is not limited thereto and other magnitude quantification mechanism may be used for the personal section 402 under essentially the same concept. It is further noted that the radar chart presented in the personality section 402 may be only an example and the present disclosure is not limited thereto. The persona settings may be configured in other GUI or non-GUI manner via the personality section under essentially the same manner. It is further noted that although each persona setting is associated with only a single value in the embodiment illustrated with reference to FIGS. 4A and 4B, the present disclosure is not limited thereto. The various global persona settings may be configured as a range having a minimum and maximum bound similar to the example explained above with reference to FIGS. 3A and 3B.

Since the independency setting 412, the formality setting 414, and the lengthiness setting 416 have been described above with reference to FIGS. 3A and 3B, the description will not be repeated herein. The proactiveness setting 418 may be adjusted between a minimum magnitude value of zero indicative of the voice assistant being reactive to user input and a maximum magnitude value of five indicative of being proactive without waiting for user input. In other words, when the proactiveness setting 418 is associated with a low value, the voice assistant system may be configured to behave in a more reactive manner and does not initiate a dialog or task without user input. When the proactiveness setting 418 is associated with a high value, the voice assistant may act more proactively and initiate dialog and tasks on its own. For instance, in response to a traffic building up on a navigation route on which the vehicle is traversing, a more proactive voice assistant may automatically inform the user about the traffic and suggest an alternative route whereas a less proactive voice assistant may be prohibited to initiate the dialog with the user until the user asks about if any alterative route is available. Additionally, in case that both the proactiveness setting 418 and the independency setting 412 are associated with high value, the voice assistant may automatically perform a new task without requiring user confirmation. Continuing with the traffic build-up example above, the voice assistant may automatically switch to a new route without asking for user confirmation.

The specificity setting 420 may be adjusted between a minimum magnitude value of zero indicative of the dialog prompt being unspecific and a maximum value of five indicative of being specific. In other words, when the specificity setting 420 is associated with a low value, the voice assistant may output prompts that only generally convey the information without specifying details of the task to enhance privacy of the user. When the specificity setting 420 is associated with a high value, the voice assistant may output more specific dialog prompt to provide more information to the user. Continuing with the navigation example discussed above, in response to the user setting Science Center as the destination, an unspecific confirmation may be "OK. Starting to navigate now." as opposed to a specific confirmation from the voice assistant such as "OK. Navigating to Science Center on 123 Atomic Ave, City, State. Planned to arrive in XX minutes."

The humor setting 422 may be adjusted between a minimum magnitude value of zero indicative of a serious conversation style and a maximum value of five indicative of a humorous conversation style.

Through the interface illustrated with reference to FIGS. 3 and 4, the vehicle designer may customize and adjust the global persona settings for one or more vehicles via the global persona setting component 206. As an example, the same global persona of the voice assistant may be assigned to a fleet of vehicles with the same model. The global persona of the voice assistant may be variated between different vehicle models. The vehicle designer may assign a higher formality setting value 414 and lower proactiveness value 418 to a business vehicle (e.g. business sedan) and a lower formality setting value 414 and higher proactiveness value 418 for a sport vehicle. Once the global persona settings are determined, the voice assistant of the vehicle 104 may operate based on the global setting within the range of each respective persona setting. The vehicle 104 may be configured adjust the respective persona setting within the range set by the global setting.

Figure 5A:
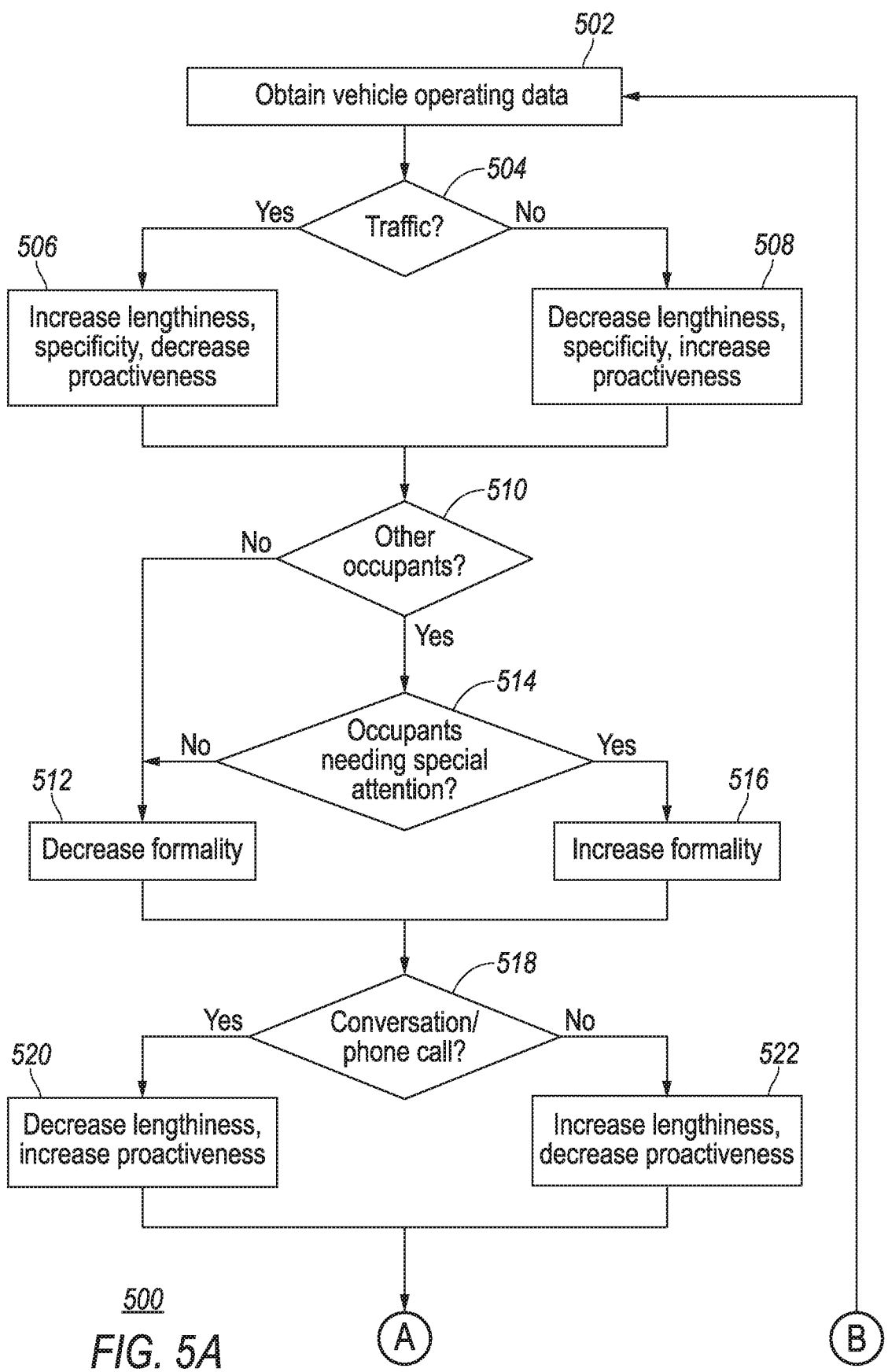
FIGS. 5A and 5B illustrate a flow diagram of an example process for adjusting the persona of a vehicle assistant system in accordance with one embodiment.
Figure 5B:
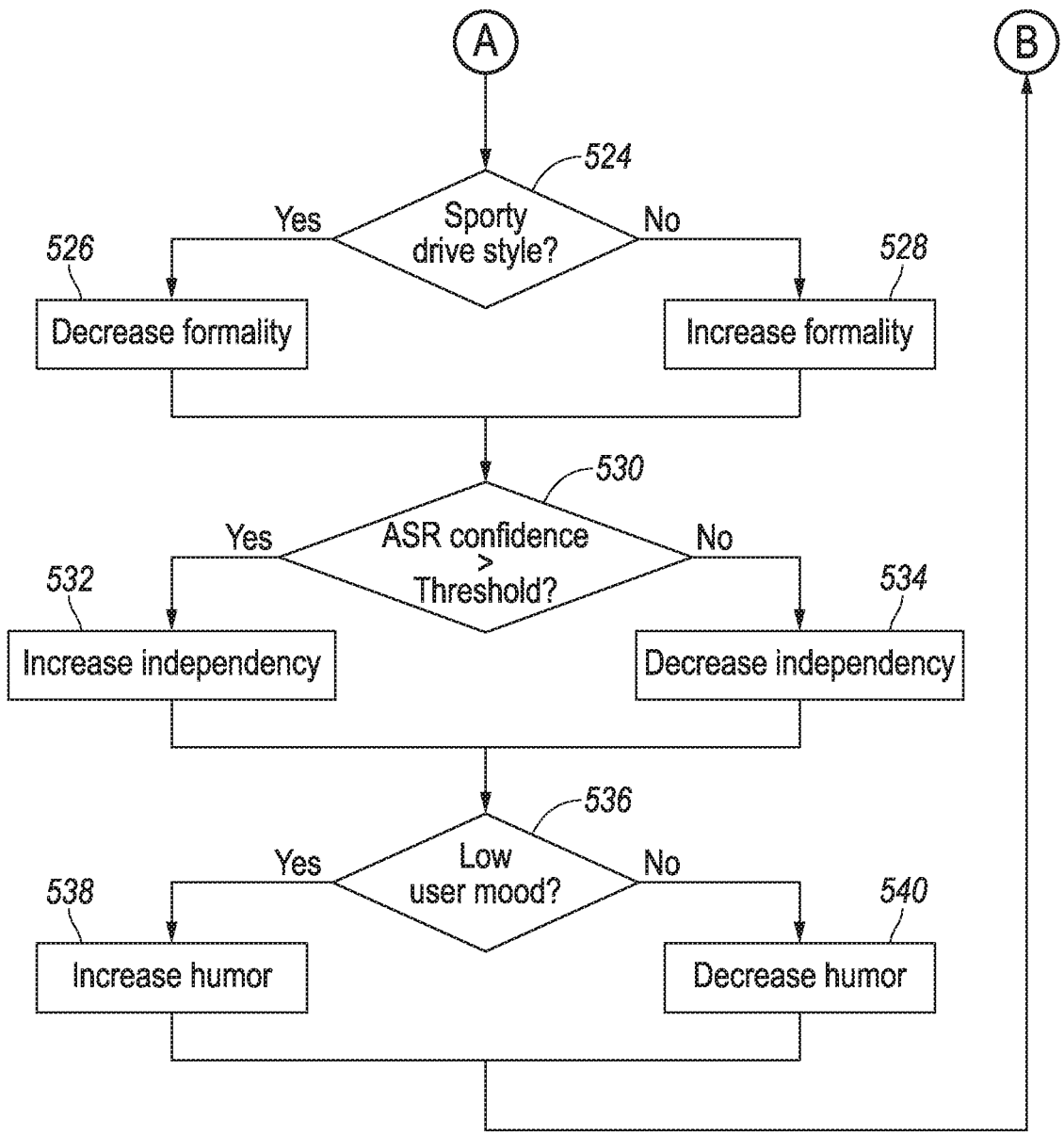

Referring to FIGS. 5A and 5B, a flow diagram of a process 500 for dynamically adjusting the persona of a vehicle assistant system based on usage condition is illustrated. With continuing reference to FIGS. 1-4, the process 500 may be fully or partially implemented by the multimodal system 130 of the vehicle 104 to adjust settings of the voice assistant system based on the global setting assigned to the vehicle 104. The process 500 may further be fully or partially implemented via other components associated with the vehicle 104 such as the mobile device 138. For simplicity, the following description will be made with reference to the multimodal system 130. At operation 502, the multimodal system 130 obtains vehicle operating data from various sensors to determine a vehicle operating condition. In general, the multimodal system 130 may be configured to adjust the various settings of the voice assistant based on the vehicle operating condition to provide the user with an improved user experience. As discussed above, the setting value for each voice assistant setting may be associated with a range having an upper bound and a lower bound automatically defined or manually set by the vehicle designer. The multimodal system 130 may be allowed to adjust the settings within the range to provide the vehicle user with an improved user experience by taking into account the vehicle operating data.

As a few non-limiting examples, the vehicle operating data may include traffic data on a route on which the vehicle is currently or planned to traverse received via the server 112. The vehicle operating data may further include a vehicle occupancy data indicative the number of users in the vehicle 104 and their identity (if applicable) detected via the camera and/or seat sensors 132. The vehicle operating data may further include data indicative of a conversation between the vehicle users as well as a conversation via the mobile device 138 detected via the microphone 142 and the connection to the mobile device 138. The vehicle operating data may further include vehicle drivetrain data indicative of a driving style (e.g. sporty, casual driving style) received from the drivetrain. The vehicle operating data may further include an automatic speech recognition (ASR) confidence data indicative of the quality and accuracy of a recognized utterance from the user. the vehicle operating data may further include a user mood data indicative of a user mood detected via the camera 132 and/or characteristics (e.g. tone, voice, pitch) of an utterance from the user. Responsive to receiving the vehicle operating data, the multimodal system 130 processes the data and determines whether one or more voice assistant settings is to be adjusted.

At operation 504, the multimodal system 130 verifies if the traffic on the route as indicated by the traffic data is above a predefined threshold. If the answer is yes, indicative of high traffic condition on the route which suggests the vehicle driving speed is relatively low, the process proceeds to operation 506 and the multimodal system 130 increases the lengthiness setting 416 and specificity setting 420 as the user may have more time to listen to a more detailed dialog from the voice assistant system. Additionally, the multimodal system decreases the proactiveness setting 506 to allow the user to make the decision on whether to perform an act. If the answer for operation 504 is no, indicative of low traffic on the route which suggest the vehicle speed is high, the process proceeds to operation 508 and the multimodal system 130 decreases the lengthiness setting 416 and the specificity setting 420 to avoid providing too much information to the driver. Additionally, the multimodal system 130 increases the proactiveness setting 418 and act in a more proactive manner.

The voice assistant may interact with a plurality of users using the vehicle 104 at the same time. Responsive to receiving a voice command from a vehicle user, at operation 510, the multimodal system 130 verifies if there are other occupants in the vehicle. If the answer is no, the process proceeds to operation 512 and the multimodal system 130 decreases the formality setting 414 provided that the user is known and familiar to the vehicle 104 and there is no need to act in such formal manner. If other users are present in the vehicle, the process proceeds to operation 514 to determine if any of the other users requires a special attention which may require the voice assistant to behave in a formal manner. For instance, users that require special attention may include a underaged user, and/or a user that is not recognized to be associated with the commanding user (e.g. a non-family member suggesting a business trip). If no special attention is needed (e.g. the passengers are adult family member of the driver), the process proceeds to operation 512. Otherwise, responsive to detecting the other occupants may require special attention suggesting a business trip or carpool situation, the process proceeds to operation 516 and the multimodal system 130 increases the formality setting 414 such that the voice assistant behaves in a more formal manner at the presence of the other occupants.

At operation 518, the multimodal system 130 determines of the vehicle user is engaging a conversation with another passenger and/or via the telephone. In general, prompts from the voice assistant may be preferably kept short when the user is having a conversation. Therefore, if the answer is yes, the process proceeds to operation 520 and the multimodal system 130 decreases the lengthiness setting 416 and specificity setting 420, and increase the proactiveness setting 418 and independency setting 412 to reduce the interruption to the user conversation. Otherwise, is the user is not having a conversation, the process proceeds to operation 522 and the multimodal system 130 increase the lengthiness setting 416 and specificity setting 420, and decreases the proactiveness setting 418 and the independency setting 412.

At operation 514, the multimodal system 130 determines a driving style of the user. Responsive to detecting a sporty driving style (e.g. fast acceleration), the process proceeds to operation 516 and the multimodal system 130 decreases the formality setting 414 of the voice assistant. Otherwise, if the multimodal system 130 detects a more casual/business driving style, the process proceeds to operation 528 and the multimodal system 130 increases the formality setting 414.

The voice assistant may be further adjusted by the ASR confidence of the user utterance. Responsive to receiving an utterance from the user, at operation 530, the multimodal system 130 determines an ASR confidence score of the user utterance received via the microphone 142. Responsive to the ASR confidence score being greater than a predefined threshold indicative of sufficient degree of confidence, the process proceeds to operation 532 and the multimodal system 532 increases the independency setting 412 to act in a more independent manner. Otherwise, the process proceeds to operation 534 and the multimodal system 130 decreases the independency setting 412 and askes for user confirmation before proceeding to perform the received voice command.

The voice assistant may be further adjusted by the emotional state or mood of the user. Responsive to receiving a user utterance, the multimodal system 130 may analyze the utterance using factors such as voice, pitch, tone or the like to determine the mood of the user. Here, the utterance may include a voice command directed to the voice assistant. Additionally or alternatively, the utterance may include a conversational speech and/or a non-conversational utterance (e.g. sigh) from the user that is captured by the microphone 142. The mood of the user may be quantified into a value, responsive to the mood value indicative of a low user mood, the process proceeds to operation 538 and the multimodal system 130 may increase the humor setting 422 attempting to cheer the user up through dialog. Otherwise, the process proceeds to operation 540 to reduce the humor setting 422. Similarly, the multimodal system 130 may increase the humor setting 422 in response to an increased traffic to keep the driver relaxed.

Figure 6:
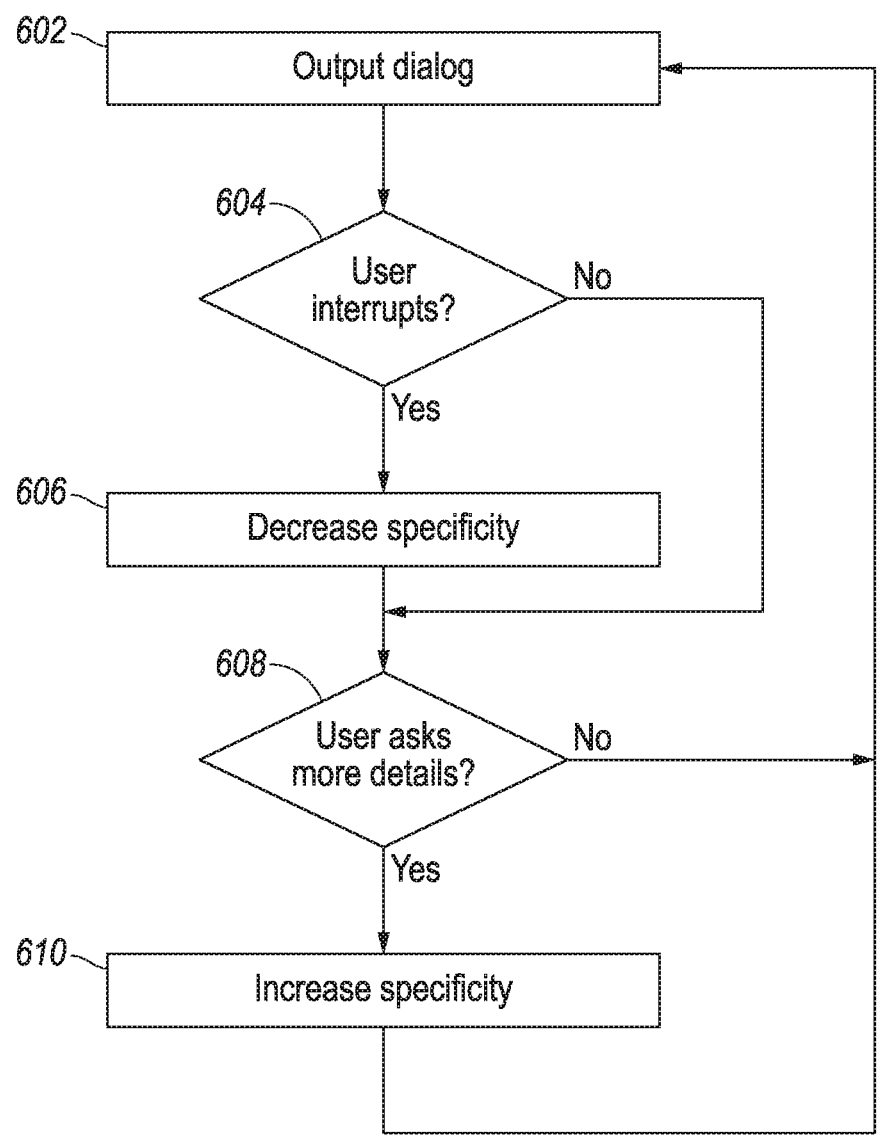
FIG. 6 illustrates a flow diagram of an example process for adjusting the persona of the vehicle assistant system in accordance with another embodiment.

Referring to FIG. 6, a flow diagram of another process 600 for dynamically adjusting the persona of a vehicle assistant system based on usage condition is illustrated. For simplicity, the following description will be made with reference to the multimodal system 130. With continuing reference to FIGS. 1-5, the voice assistant may be adjusted by user input/feedback to the output dialogue. At operation 602, the voice assistant output a dialogue via the speaker 144. The dialogue may last for a period of time (e.g. a few seconds). Responsive to detecting the user interrupting the dialogue as being output via the speaker 144, the process proceeds from operation 604 to 606 and the multimodal system 130 decreases the specificity setting 420 and the lengthiness setting 416 to reduce length of the dialogue output. At operation 608, responsive to detecting the user asking for more detailed information following the dialogue output, the process proceeds to operation 610 and the multimodal system 130 increases the specificity setting 420 and the lengthiness setting 416. In an alternative embodiment, a counter may be used to associate with operations 604 and 608, and the multimodal system 130 may only adjust the setting if the user interruption and/or question reoccurred for more than a predefined times.

Figure 7:
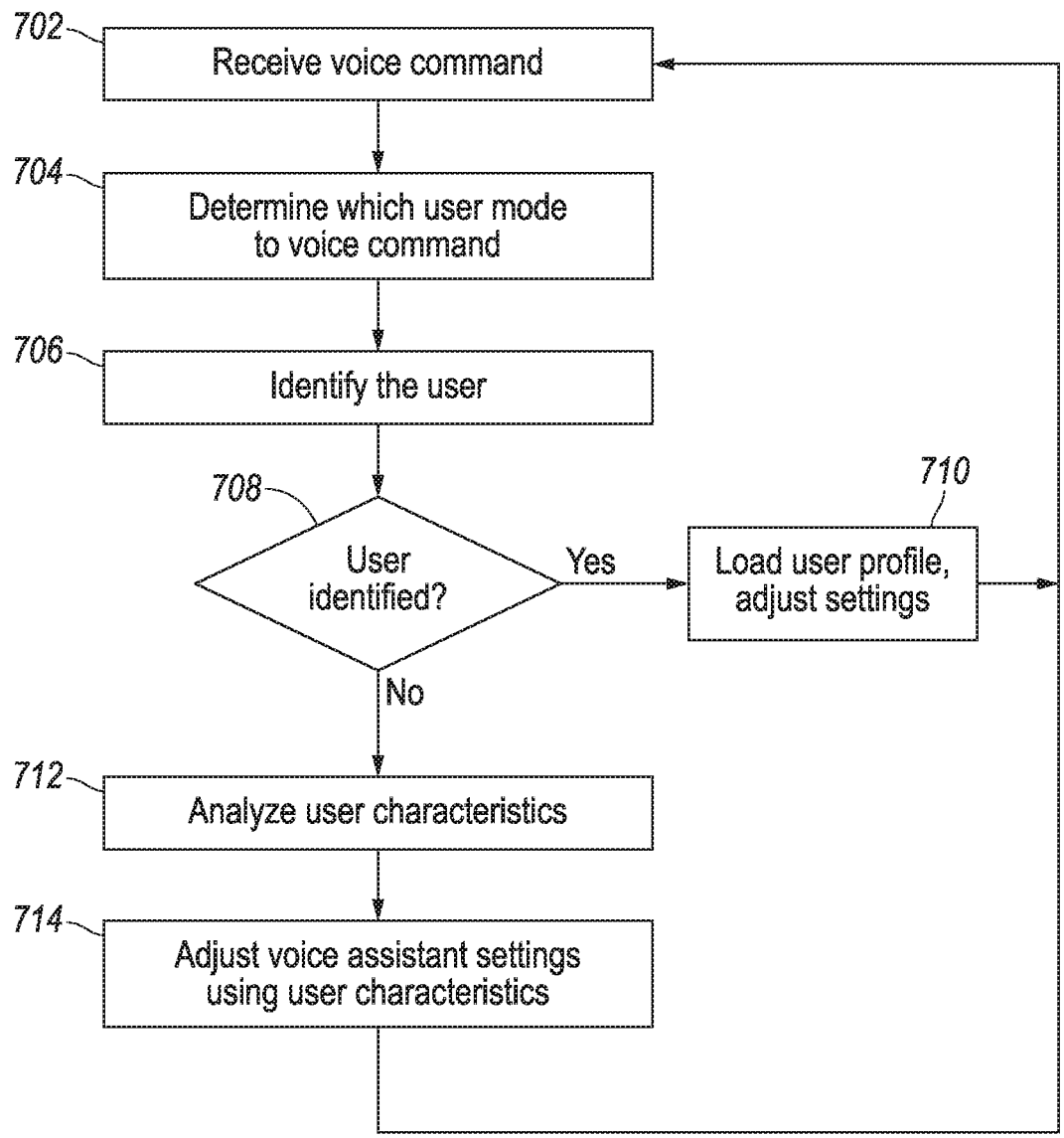
FIG. 7 illustrates a flow diagram of an example process for adjusting the persona of the vehicle assistant system in accordance with yet another embodiment.

Referring to FIG. 7, a flow diagram of another process 700 for dynamically adjusting the persona of a vehicle assistant system based on user identity and characteristics is illustrated. For simplicity, the following description will be made with reference to the multimodal system 130. With continuing reference to FIGS. 1-5, the multimodal system 130 may be configured to adjust the personality settings of the voice assistant based on identity and characteristics of the user. The user characteristics may include various information indicative of the user who is interacting with the voice assistant. For instance, the user characteristics may include user seat location indicative of the role of the user in the vehicle (e.g. driver, front passenger, rear passenger), user identity, user age or the like. At operation 702, responsive to receiving a voice command, the multimodal system 130 identifies which user the voice command come from via the vehicle sensors 132 (e.g. camera, seat sensors), microphone (e.g. sound orientation) and etc. at operation 704. Responsive to determine the user, at operation 706, the multimodal system 130 identifies the uttering user via facial recognition technology and the connections to the mobile device 138 associated with the user, to determine if the user has a user profile indicative of a voice assistant preference stored in the storage 124 at operation 708. If the answer is yes, the process proceeds to operation 710 and the multimodal system 130 loads the user profile and adjust the voice assistant system using the user profile. Otherwise, if the answer is no, the process proceeds from operation 708 to operation 712 and the multimodal system 130 analyzes the user characteristics. For instance, the multimodal system 130 may analyze the age of the uttering user using voice analysis, facial recognition and weight of the user through a seat sensor. At operation 714, the multimodal system 130 adjusts the voice assistant settings using the user characteristics obtained at operation 712.

While examples are described herein, other vehicle systems may be included and contemplated. Although not specifically shown, the vehicle may include on-board automotive processing units that may include an infotainment system that includes a head unit and a processor and a memory. The infotainment system may interface with a peripheral-device set that includes one or more peripheral devices, such as microphones, loudspeakers, the haptic elements, cabin lights, cameras, the projector and pointer, etc. The head unit may execute various applications such as a speech interface and other entertainment applications, such as a karaoke application. Other processing include text to speech, a recognition component, etc. These systems and components may respond to user commands and requests.

Computing devices described herein generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A voice assistant system for a vehicle, comprising:
    a microphone configured to detect an audio signal from a user of the vehicle, wherein the audio signal includes at least one of a system directed utterance and a non-system directed conversation;
    a speaker configured to output a dialogue in response to the audio signal; and
    a processor programmed to:
        responsive to detecting the non-system directed conversation between the user and an occupant, decrease a lengthiness setting of the voice assistant system to reduce a length of the dialogue, and increase an independency setting of the voice assistant system to prevent a confirmation question from the voice assistant system; and
        output, via the speaker, the dialogue with the reduced length without requiring a user confirmation.

2. The voice assistant system of claim 1, wherein the processor is further programmed to:

responsive to detecting an increased traffic on a route on which the vehicle traverses, increase a specificity setting of the voice assistant system to provide more detailed information via the dialogue.

3. The voice assistant system of claim 1, wherein the processor is further programmed to:
responsive to detecting a presence of the occupant other than the user in the vehicle, increase a formality setting of the voice assistant system such that the dialogue is structured in a more formal manner.

4. The voice assistant system of claim 3, wherein the processor is further programmed to:
identify the occupant; and
responsive to the occupant being unrecognized to the voice assistant system or underaged, increase the formality setting.

5. The voice assistant system of claim 1, wherein the processor is further programmed to:
responsive to detecting an acceleration of the vehicle exceeding a threshold, decrease a formality setting of the voice assistant system such that the dialogue is structured in a less formal manner.

6. The voice assistant system of claim 1, wherein the processor is further programmed to:
process the audio signal to generate a voice command and determine a confidence score for the voice command; and
responsive to the confidence score being lower than a threshold, reduce a dependency setting of the voice assistant system such that the voice assistant system asks for a user confirmation before starting to perform the voice command.

7. The voice assistant system of claim 1, wherein the processor is further programmed to:
analyze the audio signal and determine a user mood using at least one of tone or pitch of the audio signal; and
responsive to the user mood being less than a threshold, increase a humor setting of the voice assistant such that the dialogue is structured in a more relaxing manner.

8. The voice assistant system of claim 1, wherein the processor is further programmed to:
responsive to a user interruption while the dialogue is being output via the speaker, decrease a specificity setting of the voice assistant system to output a less specific dialogue.

9. A method for a voice assistant system of a vehicle, comprising:
detecting, via a microphone, an utterance from one of a plurality of users of the vehicle;
identifying the one user of the plurality of users who made the utterance;
determining a user characteristic associated with the one user;
adjust a plurality of voice assistant settings between a least one lower bound and at least one upper bound based on the user-characteristic;
identify a second user other than the one user who made the utterance;
responsive to the second user being unrecognized to the voice assistant system, increasing a formality setting; and
outputting, via an output device, a dialogue with the increased formality setting.

10. The method of claim 9, wherein the user characteristic includes at least one of: a user profile stored in the vehicle or received from a mobile device wirelessly connected to the vehicle, a user seat location or a user age.

11. The method of claim 9, wherein the voice assistant setting includes at least three of: an independency setting, a formality setting, a lengthiness setting, a proactiveness setting, a specificity setting, or a humor setting.

12. The method of claim 11, further comprising:
responsive to detecting a conversation between the plurality of users of the vehicle, decreasing the lengthiness setting of the voice assistant system, and increase the independency and proactiveness setting of the voice assistant system.

13. The method of claim 11, further comprising:
responsive to detecting an increased traffic on a route on which the vehicle traverses, increasing the humor setting.

14. The method of claim 11, further comprising:
responsive to receiving a user question asking for more information, increase the specificity setting.

15. A non-transitory computer-readable medium, comprising instructions when executed by a processor of a vehicle, cause the vehicle to:
detect, via a microphone, an utterance from one of a plurality of users of the vehicle;
identify, via the processor, the one user of the plurality of users who made the utterance;
determine, via the processor, a user characteristic associated with the one user;
adjust, via the processor, a plurality of voice assistant settings between a least one lower bound and at least one upper bound based on the user characteristic;
output, via a speaker, a dialogue based on plurality of voice assistant settings; and
responsive to a user interruption while the dialogue is being output via the speaker, decrease, via the processor, a specificity setting of the voice assistant settings to output a less specific dialogue.

16. The non-transitory computer-readable medium of claim 15, further comprising instructions, when executed by the processor of the vehicle, cause the vehicle to:
responsive to detecting a presence of another of the plurality of users being unrecognized to the vehicle or underaged, increase, via the processor, a formality setting of the voice assistant settings such that the dialogue is structured in a more formal manner.

17. The non-transitory computer-readable medium of claim 15, wherein the user characteristic includes at least one of: a user profile stored in the vehicle or received from a mobile device wirelessly connected to the vehicle, a user seat location or a user age.

* * * * *